(12) United States Patent
Hendriks et al.

(10) Patent No.: US 6,568,594 B1
(45) Date of Patent: May 27, 2003

(54) OPTICAL SCANNING DEVICE

(75) Inventors: Bernardus Hendrikus Wilhelmus Hendriks, Eindhoven (NL); Youri Martynov, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 22 days.

(21) Appl. No.: 09/913,440

(22) PCT Filed: Dec. 12, 2000

(86) PCT No.: PCT/EP00/12588
§ 371 (c)(1),
(2), (4) Date: Aug. 14, 2001

(87) PCT Pub. No.: WO01/45098
PCT Pub. Date: Jun. 21, 2001

(30) Foreign Application Priority Data

Dec. 15, 1999 (EP) .............................................. 99204330

(51) Int. Cl.[7] .............................. G06K 7/10; G06K 7/14
(52) U.S. Cl. .................................. 235/454; 235/462.01
(58) Field of Search ...................... 235/462.01, 462.02, 235/462.1, 462.11–462.19, 462.25, 462.47, 472.01, 472.02, 454, 470; 369/44.23, 94, 112.24, 244, 53.41, 44.27, 53.22, 44.14; 359/569, 900

(56) References Cited

U.S. PATENT DOCUMENTS

| 5,125,750 | A | | 6/1992 | Corle et al. ................. 359/819 |
| 5,644,413 | A | * | 7/1997 | Komma et al. .......... 369/44.23 |
| 5,784,168 | A | * | 7/1998 | Ophey et al. ............... 356/615 |
| 5,789,743 | A | * | 8/1998 | Van Rosmalen ............ 250/234 |
| 6,191,811 | B1 | * | 2/2001 | Nishimura et al. ........... 348/96 |
| 6,192,022 | B1 | * | 2/2001 | Hendriks et al. ...... 369/112.24 |
| 6,229,600 | B1 | * | 5/2001 | Martynov et al. .......... 356/123 |
| 6,256,287 | B1 | * | 7/2001 | Baartman et al. ........... 369/244 |
| 6,285,641 | B1 | * | 9/2001 | Dang et al. .............. 369/53.41 |

* cited by examiner

Primary Examiner—Thien M. Le
(74) Attorney, Agent, or Firm—Michael E. Belk

(57) ABSTRACT

An optical scanning device has a three element compound objective lens where a dual lens objective lens system is combined with a solid immersion lens to form an ultra high numerical aperture compound objective lens capable of reading from different information layers in a multilayer optical record carrier.

19 Claims, 5 Drawing Sheets

OPTICAL SCANNING DEVICE

FIELD OF THE INVENTION

This invention relates to an optical scanning device for scanning an optical record carrier, such as an optical disk, comprising at least one information layer, the device comprising a radiation source for generating a radiation beam and a compound objective lens system located in an optical path between the radiation source and the record carrier for converging the radiation beam to a spot on an information layer.

BACKGROUND OF THE INVENTION

There is a need for the production of optical record carriers of high capacity. Optical disks have been devised that have multiple information layers in a single disk (referred to as a "multilayer" disk). It is also possible to increase the amount of information stored on a disk by decreasing the size of the data markings. In order to read such small data markings, optical scanning devices using a relatively short wavelength and a high numerical aperture (NA) objective lens system, with at least NA>1 and preferably NA=>1.6 (an "ultra-high" numerical aperture), are desirable.

U.S. Pat. No. 5,125,750 proposes an optical scanning device using an objective lens system of two lenses with the first lens element being a single objective lens well corrected for aberrations and the second lens being a solid immersion lens (SIL). The use of the SIL increases the numerical aperture of the system whilst reducing, or at least not introducing, unwanted aberrations as the beam enters the optical disk medium. There are two proposed configurations of such a dual-lens objective, the "centre of curvature" case and the Huygens aplanatic case. These configurations are described briefly below. For a more detailed explanation see W T Welford, Aberrations of Optical Systems (Adam Hilger, Bristol, 1991), pp. 158–161.

In the "centre of curvature" case, a single objective lens element is combined with a spherical plano-convex SIL having a spherical radius r and an axial thickness d substantially equal, i.e. d=r. With the beam properly focused on the exit surface of the SIL, it enters the SIL medium without refraction. The total numerical aperture of this system, in which the objective lens element has a numerical aperture $NA_{OBJ}$ and the SIL has a refractive index $n_{SIL}$, is $$NA = n_{SIL} \cdot NA_{OBJ}$$

From this equation it can be seen that the total numerical aperture of the system is increased when the SIL is used, by a factor equal to the refractive index of the SIL. The maximum refractive index obtainable in a SIL is approximately 2.2 and the maximum numerical aperture of a single lens objective lens is approximately 0.65. Therefore, the maximum obtainable numerical aperture is approximately equal to 1.4.

In the Huygens aplanatic case a single lens objective is combined with a spherical plano-convex SIL in which the spherical radius r and axial thickness d are related by the refractive index of the SIL $n_{SIL}$, namely $d=r+r/n_{SIL}$. With the beam properly focused on the SIL the beam is refracted and additionally focused on entering the SIL medium. The total numerical aperture of this system, in which the objective lens element has a numerical aperture $NA_{OBJ}$, is $$NA = n^2_{SIL} \cdot NA_{OBJ}$$

with the constraint $NA<n_{SIL}$.

This arrangement may therefore be used to provide an ultra-high NA objective lens system.

SUMMARY OF THE INVENTION

The inventors recognize that tolerances in variations in thickness and radius of the SIL are low and these variations must be below 0.5 μm. The SIL therefore becomes a relatively difficult component to manufacture. Furthermore, because of these strict tolerances the objective lens system is not capable of reading different layers of a multilayer disk.

In accordance with one aspect of the invention there is provided an optical scanning device for scanning an optical record carrier including at least one information layer, the device comprising a radiation source for generating a radiation beam and a compound objective lens system, located in an optical path between the radiation source and the location of the record carrier, for converging the radiation beam to a spot on a said information layer, wherein the compound objective lens system comprises a first lens element, a second lens element located between the first lens element and the location of the record carrier, and a third lens element located between the second lens element and the location of the record carrier, wherein the first lens element is arranged to converge the beam to a first convergent state, the second lens element is arranged to converge the beam to a second convergent state, said second state being of greater convergence than said first state, and the third lens element is arranged to supply the beam to the spot on the information layer.

BRIEF DESCRIPTION OF THE DRAWINGS

Features and advantages of the invention will become apparent from the following description of preferred embodiments of the invention, given by way of example only, with reference to the accompanying diagrams in which.

DETAILED DESCRIPTION OF THE INVENTION

Figure 1:
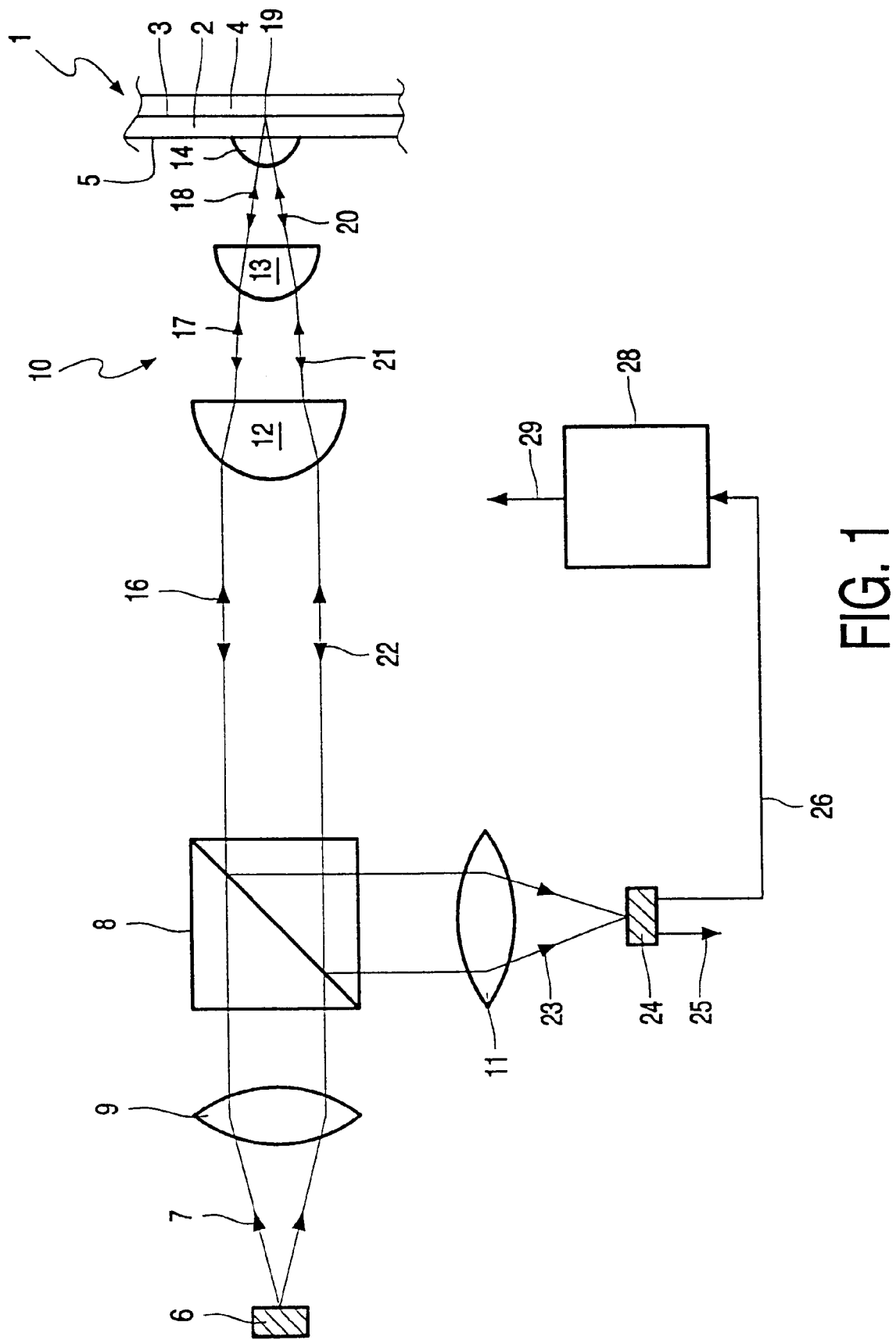
FIG. 1 is a schematic illustration of a general layout used in accordance with embodiments of the invention.

With reference to FIG. 1, an optical disk 1 comprises an outer transparent layer 2 within which at least one information layer 3 is arranged. In the case of a multilayer optical disk, two or more information layers are arranged behind the transparent layer 2, at different depths within the disk. The side of the information layer 3, or in the case of a multilayer disk the side of the layer furthest away from the transparent layer 2, facing away from the transparent layer is protected from environmental influences by a protection layer 4. The side of the transparent layer facing the device is the disk entrance face 5. The transparent layer 2 acts as a substrate for the optical disk by providing mechanical support for the information layer 3 or layers. Alternatively, the transparent layer may have the sole function of protecting the information layer 3, in the case of a multilayer disk the uppermost information layer, while the mechanical support is provided by a layer on the other side of the information layer, for instance by the protection layer 4 or by a further information layer and transparent layer bonded to the uppermost information layer.

In the examples described below, it is assumed that a transparent layer is present on the optical disk. However, an outer transparent layer is not essential and the disk may be an air incident medium with an information layer 3 coincident with the entrance face 5.

Information may be stored in the information layer 3 or layers of the optical disk in the form of optically detectable marks arranged in substantially parallel, concentric or spiral tracks, not shown in FIG. 1. The marks may be in any optically readable form, for example in the form of pits or areas with a reflection coefficient different from their surroundings, or magneto-optical form.

The scanning device includes a radiation source 6, for example a semiconductor laser, emitting a diverging radiation beam 7. The lens system of the device includes a collimator lens 9, a compound objective lens 10 and a condenser lens 11. A beam splitter 8, for example a semi-transparent plate arranged at 45° to the optical axis, passes the radiation beam towards the compound objective lens. The compound objective lens 10 includes a first, or back lens, element 12, a second, or middle, lens element 13 and a third, or front, lens element 14. The front lens element 14 is a plano-convex SIL. Each of the back lens element 12 and the middle lens element 13 are shown in FIG. 1 as a plano-convex lens, however, other lens types such as convex-convex, convex-concave or concave-convex lenses may also be used. Particular reference is made to the arrangement shown in FIG. 2, to be described below.

The collimator lens 9 transforms the diverging radiation beam 7 to a collimated beam 16. By collimated, we intend to mean a substantially parallel beam, for which the compound objective lens 10 has a transverse magnification substantially equal to zero. The need for a collimated beam arises when optical elements in the collimated beam path are designed for use with an ideally collimated (parallel) beam. A collimated beam is not necessary when the elements in the beam path are designed for use with a divergent or convergent beam. Even using elements designed for use with an ideally collimated beam, a certain tolerance as to vergence of the beam is acceptable, depending on the efficiency required of the optical system. To achieve the efficiency desired of the present optical system, which includes the beam splitter 8 and may include other optical elements such as a quarter wavelength plate, the collimated beam preferably has a vergence resulting in an absolute magnification of the objective lens smaller than 0.02.

The compound objective lens 10 transforms the incident collimated beam 16 first to a convergent beam 17 between the back lens element 12 and the middle lens element 13, and then to a more convergent beam 18 between the middle lens element and the front lens element 14. The effect of the front lens element 14, being an SIL, is to increase the numerical aperture of the system further, without introducing spherical aberrations, or reducing unwanted spherical aberrations, as the beam enters the entrance face 5 of the disk, thereby increasing the convergence of the beam inside the transparent layer 2 compared to the effect achieved without a SIL present.

The compound objective lens 10 transforms the reflected beam in correspondingly opposite stages, from a greatly divergent beam 20 between the front lens element 14 and the middle lens element 13, to a lens divergent beam 21 between the middle lens element 13 and the back lens element 12, to a substantially collimated reflected beam 22. The beam splitter 8 separates the reflected beam by reflecting at least part of the reflected beam 22 towards the condenser lens 11. The condenser lens 11 transforms the incident beam into a convergent reflected beam 23 focused on detection systems 24, generally indicated by single element in FIG. 1.

The detection systems 24 capture the radiation and convert it into electrical signals. One of these signals is an information signal 25, the value of which represents the information read from the information layer 3. Another signal is the focus error signal 26, the value of which represents the axial difference in height between the spot 19 and the information layer 3 desired to be scanned. The focus error signal 26 is input to a focus servo controller 28. The controller 28 generates one or more focus servo control signals 29 which control the axial position of at least one of the three objective lens elements 12, 13, 14 with respect to another of the lens elements such that the axial position of the spot 19 coincides substantially with the plane of the information layer 3, or in the case of a multilayer disk a selected information layer. For example, in the case of a dual layer disk the focus error signal 26 generated will follow the form of a dual layer "S" curve with two zero crossings at a positive gradient, one for each information layer. Switching focusing between the two layers may be performed electronically by means not shown in FIG. 1.

Figure 2:
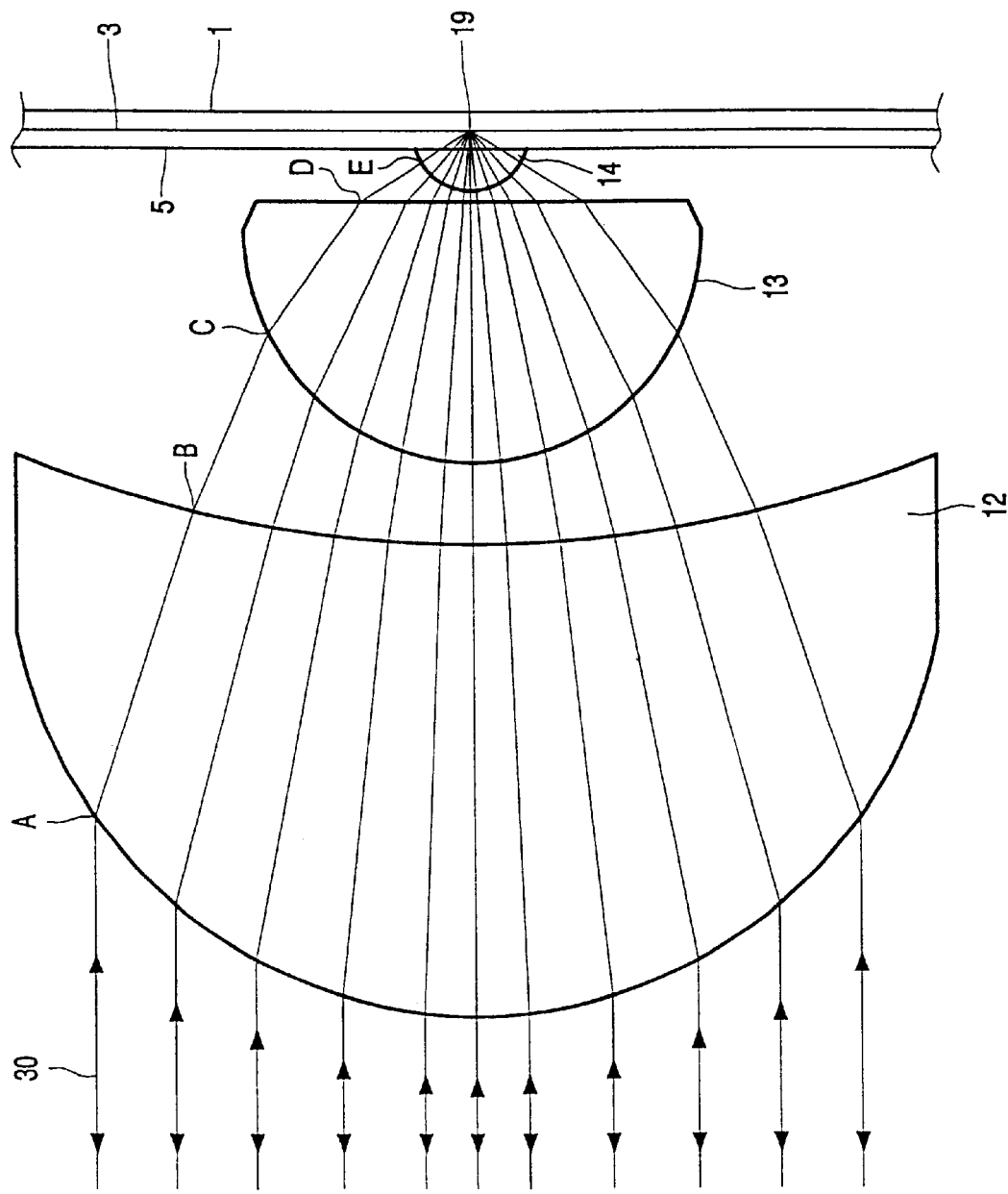
FIG. 2 is a cross-sectional view of a compound objective lens system used in accordance with embodiments of the invention.

FIG. 2 shows the three lens objective lens system 10 in cross section. The first lens element 12 is a concave-convex lens having a maximum axial thickness, at its centre, of approximately 2050 $\mu$m. The second lens element 13 is a plano-concave lens having an axial thickness of approximately 1100 $\mu$m. The SIL 14 is a spherical plano-convex lens and has a radius of approximately 250 $\mu$m and, assuming the thickness of any transparent layer present on the optical disk is negligible, a substantially equal axial thickness of approximately 250 $\mu$m. If a transparent layer is to be present, the total axial thickness of the SIL, 14 and the transparent layer 2 is in any case selected to be substantially equal to the radius of the SIL 14. The SIL 14 is operated in a near field mode by ensuring that the exit surface of the SIL, is located within approximately the distance of 1, and preferably 0.1, wavelength from the entrance face 5.

A given ray of light 30 parallel to and spaced from the optical axis on entering the objective lens system at A is refracted towards the optical axis at point A of the entrance surface of the first lens element 12. The light ray passes through the first lens element 12, is refracted towards the optical axis at point B of the exist surface, and impinges upon the entrance surface second lens element 13 at point C. The light ray is refracted once more towards the optical axis on entry into the second lens element 13, passes through the second lens element 13, is refracted towards the optical axis as it exits the second lens element at point D and impinges on the entrance surface of the SIL 14 at point E. The ray is not refracted at the entrance surface of the SIL 14. In this way, the light entering the objective lens system is converged by the lenses 12, 13, 14 to a spot 19 on the, or an, information layer 3 of the optical disk 1. The first lens 12 and the second lens 13 when correctly spaced axially are well corrected for spherical aberrations and together have a numerical aperture of approximately 0.85 and a free working distance of approximately 300 μm. As the two lenses 12, 13 have a relatively large free working distance, the third lens, the SIL 14, can be placed between the exit surface of the second lens 13 and the entrance face 5 of the optical disk.

The SIL 14 is of the "centre of curvature" type, with its spherical radius substantially equal to its axial thickness. This construction of SIL has an axial thickness tolerance of ±10 μm and the arrangement thus allows for the individual scanning of both of two information layers spaced by up to 20 μm in an optical disk. The SIL 14 may for example be made of cubic zirconia having a refractive index of 2.1419, giving a numerical aperture of the three lens system is 1.83. This therefore makes multilayer readout possible at a numerical aperture of 1.83. The SIL may be made of other materials having a relatively high refractive index (preferably $n_{SIL}>1.5$). The refractive index of the SIL is selected to substantially match the refractive index presented by the disk 1 at the entrance face 5. To obtain an appropriate match, a transparent layer having such a relatively high refractive index may be placed on the optical disk 1 to form its entrance face 5.

In the following description of each of the first to third embodiments, it is to be appreciated that the above discussion relating to FIGS. 1 and 2 is intended to apply thereto, and that the components present, and modifications thereof, described in relation to FIGS. 1 and 2 are intended to apply to each of the first to third embodiments.

Figure 3:
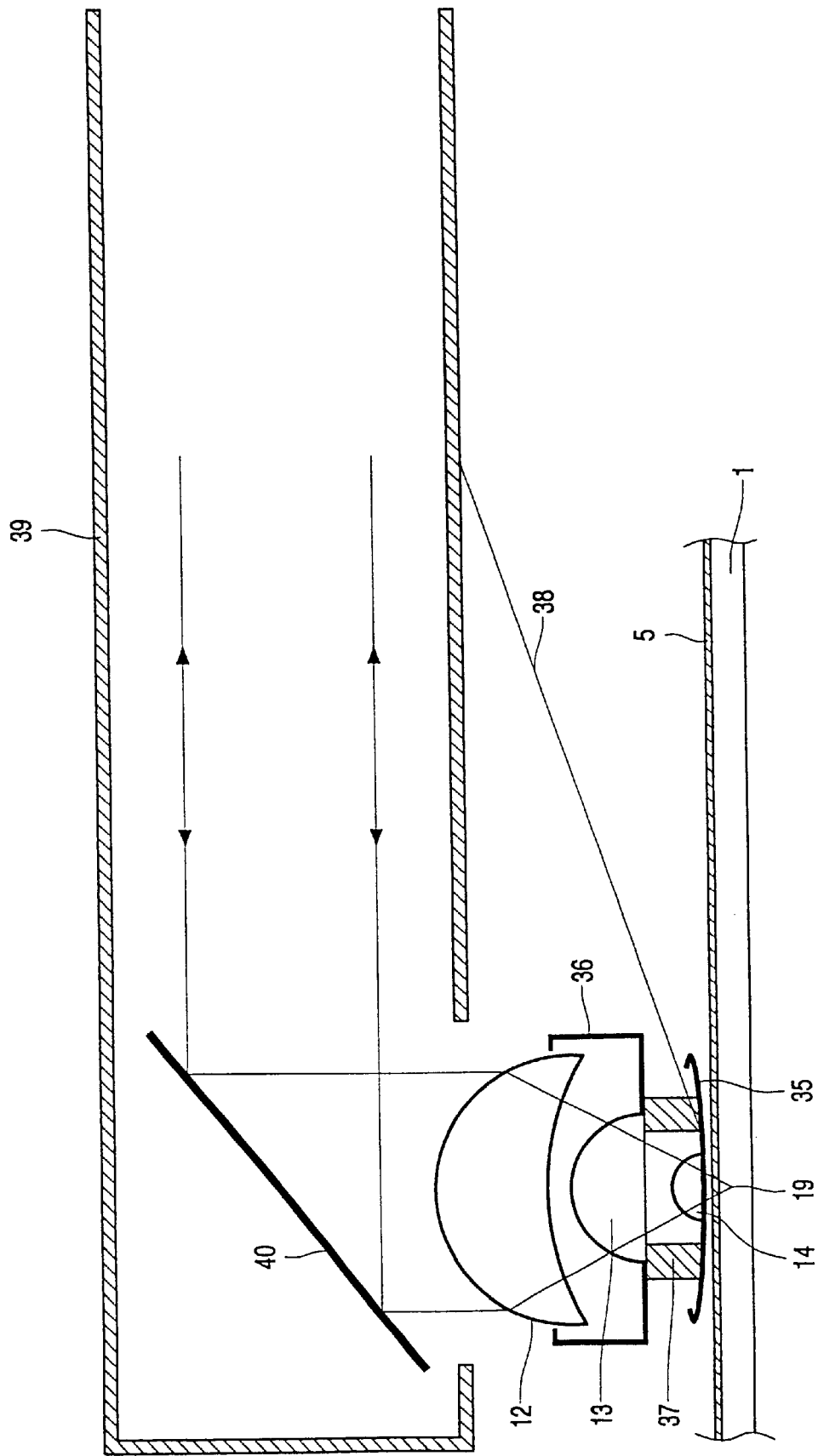
FIG. 3 is a schematic illustration showing an objective lens system mounted in an optical scanning device in accordance with a first embodiment of the invention.

Referring now to FIG. 3, in a first embodiment of the invention, the SIL 14 and the other objective lenses 12, 13 are mounted on an air-bearing slider 35 positioning the SIL 14 at a predetermined distance above the entrance face 5 of the optical disk to be read whilst the disk is spinning under control of a servo motor. The first lens 12 and the second lens 13 are commonly held by a rigid mounting 36 whereby their axial positioning is fixed with respect to each other. The axial distance between the rigid dual lens and the SIL 14 is adjustable by a piezo actuator 37 controlled by means of the above-described focus servo control signal 29 and/or a signal switching between information layers in the disk 1. The whole system is carried via a spring mounting 38 on a rotary arm radial actuator 39 i.e. for tracking, moving the system radially across disk 1. The rotary arm 39 includes a beam folding mirror 40 for directing the collimated beams to and from the objective lens system.

The piezo actuator 37 may be a low bandwidth actuator to allow for switching between information layers in the disk 1 and to allow for low bandwidth focus servo control to correct for defocusing effects caused by temperature and wavelength variations. A different form of focus actuator could be used. Alternatively, the focus actuator 37 may be replaced by a rigid mounting, whilst focus control may be performed by actuating an optical element (e.g. mechanical axial movement of the collimator lens 9 shown in FIG. 1) outside the objective lens system. With or without the piezo actuator 37, the optical readout system may switch from one information layer to another by use of such an optical element positioned outside the three lens objective system.

In this embodiment, the slider 35 has to carry the weight of all three lens elements and the system may be sensitive to tilt of the disk. Disk tilt can lead to spot excursion with respect to the bottom surface of the slider. In a magneto-optic disk recording/reproducing system, to which this invention in all its embodiments may be applied, the slider also carries a magnetic coil with an optical window in its centre. For this embodiment the window must therefore be relatively large, which can lead to degraded coil performance.

Figure 4:
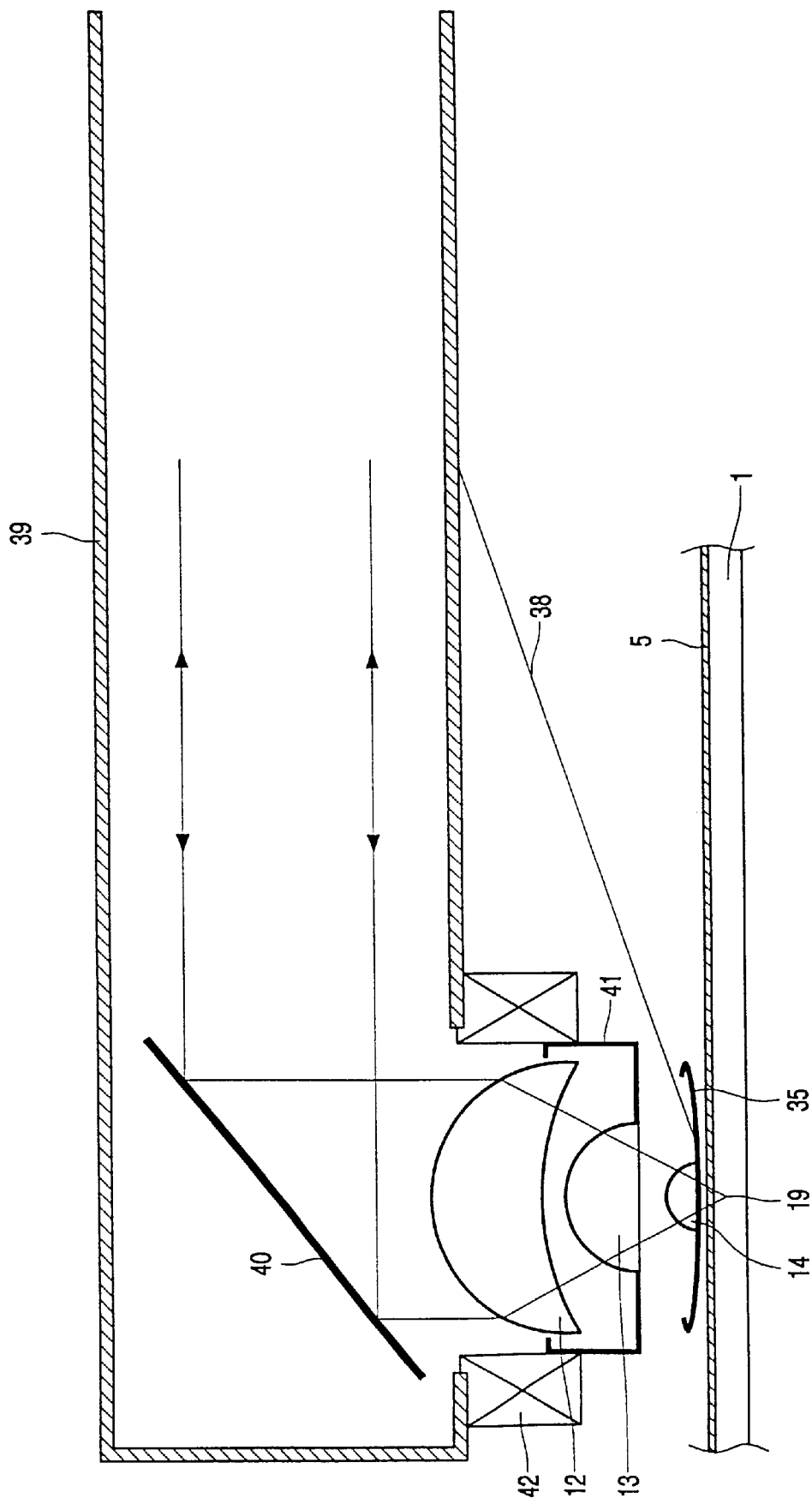
FIG. 4 is a schematic illustration of an objective lens system mounted in an optical scanning device in accordance with a second embodiment of the invention.

FIG. 4 shows the second embodiment of the invention. Elements having the same reference numerals as elements shown in FIG. 3 have the same function. The first lens 12 and the second lens 13 are commonly held by a rigid mounting 41 whereby their axial positioning is fixed with respect to each other. In this embodiment only the SIL 14 is carried by the slider 35. The rigid dual lens is carried directly by the rotary arms 39 and the SIL 14, mounted on the slider 35, is suspended by a spring 38 below the rigid dual lens. The SIL 14 is positioned by the slider 35 at a predetermined level above the optical disk 1 whilst the disk is spinning.

The axial position of the rigid dual lens with respect to the SIL 14 positioned on the slider 35 is variable and adjustable by means of an electromagnetic focus actuator 42 under control of the focus servo control signal 29 and/or a signal switching between information layers in the disk 1. The focus actuator 42 may have a relatively high bandwidth, and may be used for all focusing functions. Alternatively, the actuator 42 may be replaced by a rigid mounting and an element outside the objective lens system, such as that described above, may be used for all focusing functions.

As the SIL 14 is mechanically de-coupled from the lenses 12, 13, by allowing the SIL 14 to rotate freely to some extent about its centre of curvature, the system can be made relatively tolerant to disk tilt. The tolerance on de-centring of the SIL on the slider with respect to the dual lens objective lens system 12, 13 should however be relatively strict. The lenses 12, 13, 14 may be coupled tightly mechanically via the rotary arm 39 in directions parallel to the plane of the disk to avoid de-centring.

Figure 5:
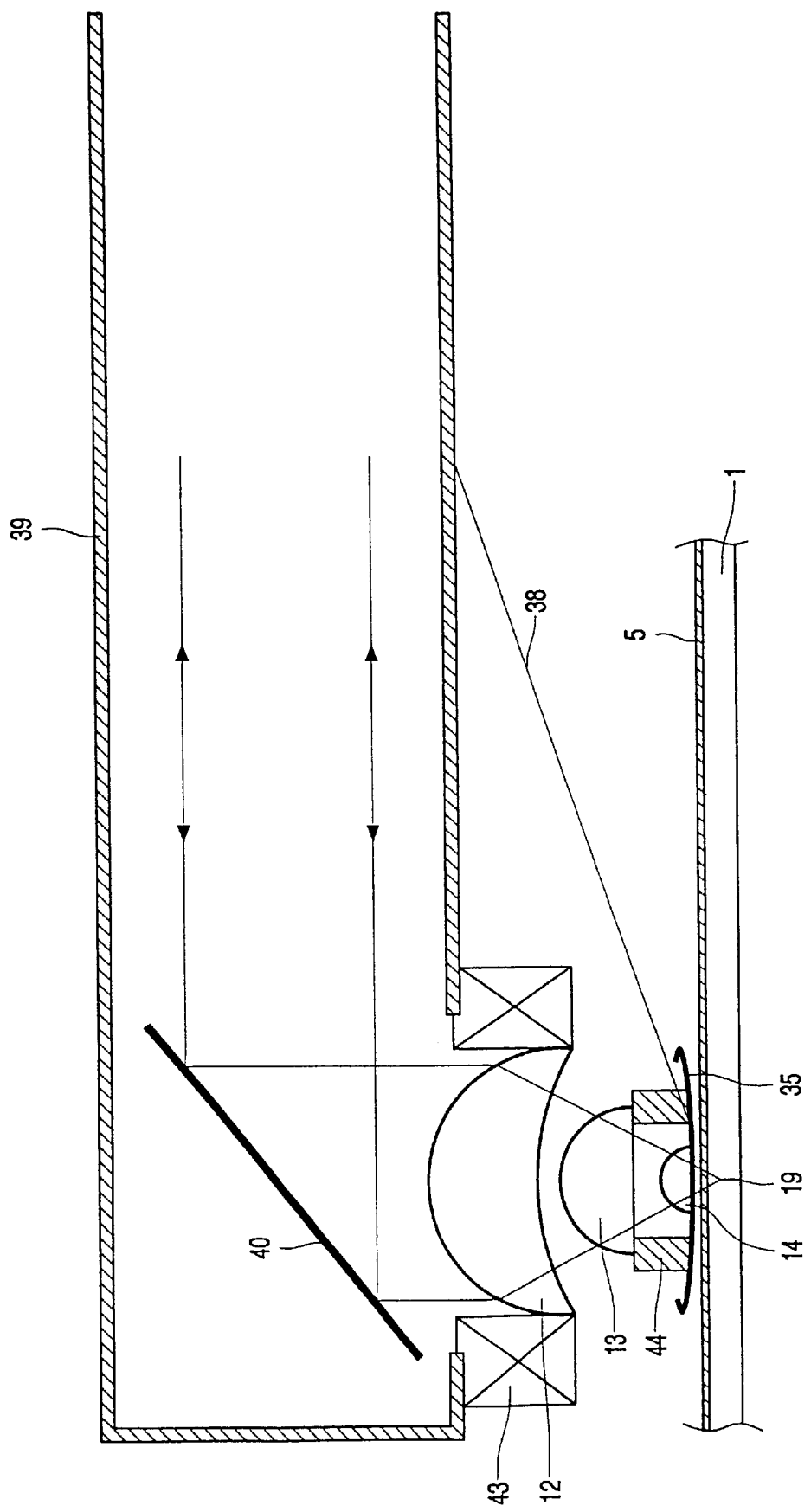
FIG. 5 is a schematic illustration of an objective lens system mounted in an optical scanning device in accordance with a third embodiment of the invention.

FIG. 5 shows the third embodiment of the invention. Again, elements having the same reference numerals as elements shown in FIGS. 3 or 4 have the same function. The first lens 12 is mounted to the rotary arm 38 by an electromagnetic focus actuator 43 whereby the axial positioning of the first lens 12 may be individually altered under the control of a focus servo control signal 29 and/or a signal switching between information layers in the disk. The second lens 13 is mounted on the slider 35 with the SIL 14. The second lens 13 is adjustable in height with respect to the SIL 14 by means of a piezo actuator 44. The axial positioning of the second lens 13 may then be individually altered under the control of a focus servo control signal 29 and/or a signal switching between information layers in the disk. Alternatively, the piezo actuator 44 may be replaced by a rigid mounting. Further alternatively, the electromagnetic actuator may also be replaced by a rigid mounting whilst an element outside the objective lens system, such as that described above, may be used for all focusing functions.

It will be appreciated that in relation to all of the above described embodiments, a linear motor can be used for tracking instead of a rotary arm actuator as described above. The dimensions of the lenses given above are not limiting and any suitable size lens giving the appropriate characteristics may be used. Furthermore, although the third lens element is an SIL, arrangements in which the third lens element is not an SIL may also be employed in all of the above-described embodiments, without departing from the scope of the invention, in order to provide a high numerical aperture objective lens system capable of reading different layers of a multilayer disk.

What is claimed is:

1. An optical scanning device for scanning an optical record carrier including at least one information layer, the device comprising a radiation source for generating a radiation beam and a compound objective lens system, located in an optical path between the radiation source and the location of the record carrier, for converging the radiation beam to a spot on a said information layer, wherein the compound objective lens system comprises a first lens element, a second lens element located between the first lens element and the location of the record carrier, and a third lens element located between the second lens element and the location of the record carrier, wherein the first lens element is arranged to converge the beam to a first convergent state, the second lens element is arranged to converge the beam to a second convergent state, said second state being of greater convergence than said first state, and the third lens element is arranged to supply the beam to the spot on the information layer.

2. An optical scanning device according to claim 1, further comprising a slider for locating the third lens element axially with respect to the record carrier, whilst the record carrier moves with respect to the lens system.

3. An optical scanning device according to claim 2, in which the first, second and third lens elements are carried primarily by the slider.

4. An optical scanning device according to claim 2, in which the third lens element is carried primarily by the slider, whilst the first and second lens elements are carried primarily by a separate portion, or portions, of the device.

5. An optical scanning device according to claim 2, in which the second and third lens elements are carried primarily by the slider, whilst the first lens element is carried primarily by a separate portion, or portions, of the device.

6. An optical scanning device according to claim 1, in which the relative positioning of the lens elements is controlled by a focus actuator.

7. An optical scanning device according to claim 6, in which the focus actuator is arranged to axially move the second lens element with respect to the first lens element.

8. An optical scanning device according to claim 1, in which the position of the second lens element is fixed with respect to the first lens element.

9. An optical scanning device according to claim 1, comprising a focus actuator for axially moving the first lens element with respect to the second lens element.

10. An optical scanning device according to claim 1, arranged to alter focusing between information layers in the record carrier by focusing means outside the path of the compound objective lens.

11. An optical scanning device according to claim 1, in which the numerical aperture of the compound objective lens is greater than 1.6.

12. An optical scanning device according to claim 1, in which the third lens element comprises a solid immersion lens.

13. An optical scanning device according to claim 12, in which the thickness tolerance of the solid immersion lens is such that the compound objective lens system is capable of focusing on any of a plurality of information layers located at different respective depths in the optical record carrier.

14. An optical scanning device according to claim 1 for scanning an optical record carrier including a transparent layer behind which the at least one information layer is located in the record carrier.

15. An optical scanning device according to claim 14 for scanning an optical record carrier including a transparent layer having a refractive index substantially the same as the solid immersion lens.

16. An optical scanning device according to claim 13, in which the solid immersion lens is partially spherical and has a substantially equal radius and thickness.

17. An optical scanning device according to claim 14, in which the solid immersion lens is partially spherical and the combined thickness of the solid immersion lens and the transparent layer is substantially equal to the radius of the solid immersion lens.

18. An optical scanning device according to claim 15, in which the first and/or second lens elements are plano-convex lenses.

19. An optical scanning device according to claim 1, in which the first and/or second lens elements are concave-convex.

* * * * *